US009812095B2

(12) United States Patent
Jeon et al.

(10) Patent No.: US 9,812,095 B2
(45) Date of Patent: Nov. 7, 2017

(54) VIDEO PROCESSING METHOD INCLUDING MANAGING A REFERENCE PICTURE LIST AND VIDEO SYSTEM THEREFORE

(71) Applicant: Samsung Electronics Co., Ltd., Suwon-si, Gyeonggi-do (KR)

(72) Inventors: Jun-Shik Jeon, Yongin-si (KR); Sungho Roh, Seoul (KR)

(73) Assignee: SAMSUNG ELECTRONICS CO., LTD., Gyeonggi-do (KR)

( * ) Notice: Subject to any disclaimer, the term of this patent is extended or adjusted under 35 U.S.C. 154(b) by 44 days.

(21) Appl. No.: 14/959,338

(22) Filed: Dec. 4, 2015

(65) Prior Publication Data

US 2016/0171641 A1    Jun. 16, 2016

(30) Foreign Application Priority Data

Dec. 11, 2014  (KR) .................. 10-2014-0178636

(51) Int. Cl.
| | | |
|---|---|---|
| *H04N 19/50* | (2014.01) | |
| *H04N 19/70* | (2014.01) | |
| *H04N 19/105* | (2014.01) | |
| *G09G 5/39* | (2006.01) | |
| *H04N 19/61* | (2014.01) | |

(52) U.S. Cl.
CPC ............ *G09G 5/39* (2013.01); *H04N 19/105* (2014.11); *H04N 19/50* (2014.11); *H04N 19/61* (2014.11); *H04N 19/70* (2014.11); *G09G 2320/106* (2013.01); *G09G 2360/12* (2013.01); *G09G 2360/128* (2013.01); *G09G 2360/18* (2013.01)

(58) Field of Classification Search
None
See application file for complete search history.

(56) References Cited

U.S. PATENT DOCUMENTS

| | | | |
|---|---|---|---|
| 8,184,690 B2 | 5/2012 | Sumioka et al. | |
| 8,331,703 B2 | 12/2012 | Malmborg et al. | |
| 8,498,334 B1 | 7/2013 | Choudhary | |
| 8,548,041 B2 | 10/2013 | Fu et al. | |
| 8,737,473 B2 | 5/2014 | Abe et al. | |
| 8,824,541 B2 | 9/2014 | Zhao et al. | |
| 2008/0165864 A1* | 7/2008 | Eleftheriadis .. | H04N 21/234327 375/240.29 |
| 2013/0077677 A1 | 3/2013 | Wang et al. | |
| 2013/0114741 A1 | 5/2013 | Sullivan et al. | |
| 2014/0010291 A1* | 1/2014 | He ......................... | H04N 19/50 375/240.12 |
| 2015/0078458 A1* | 3/2015 | Samuelsson ........... | H04N 19/70 375/240.25 |
| 2015/0281732 A1* | 10/2015 | Kim ..................... | H04N 19/503 375/240.12 |
| 2016/0182916 A1* | 6/2016 | Lee ...................... | H04N 19/105 375/240.12 |

FOREIGN PATENT DOCUMENTS

| | | |
|---|---|---|
| JP | 2009010794 A | 1/2009 |
| KR | 20120035824 A | 4/2012 |

* cited by examiner

*Primary Examiner* — Joni Richer
(74) *Attorney, Agent, or Firm* — Harness, Dickey & Pierce, P.L.C.

(57) ABSTRACT

An image processing method of a video device includes storing a plurality of pictures into a buffer, parsing header information of a current image of the plurality of pictures and managing a reference picture list of the current image while the current image is processed by a video engine based on the parsed header information.

11 Claims, 12 Drawing Sheets

VIDEO PROCESSING METHOD INCLUDING MANAGING A REFERENCE PICTURE LIST AND VIDEO SYSTEM THEREFORE

CROSS-REFERENCE TO RELATED APPLICATIONS

A claim for priority under 35 U.S.C. §119 is made to Korean Patent Application No. 10-2014-0178636 filed Dec. 11, 2014, in the Korean Intellectual Property Office, the entire contents of which are hereby incorporated by reference.

BACKGROUND

Example embodiments of inventive concepts described herein relate to video signal processing such as image processing of a video device capable of improving an image processing speed.

In recent years, a demand for high-resolution and high-quality images such as High Definition (HD) images and Ultra High Definition (UHD) images is increasing in various application fields.

The high-resolution and high-quality images cause an increase in data throughput as compared with conventional image data. For this reason, transmission and storage charges increase in transferring image data using a medium such as a conventional wired/wireless wideband circuit or storing it using a conventional storage medium.

High-efficiency image compression techniques are used for high-resolution and high-quality images.

There exist the following various techniques: an inter-screen prediction technique for predicting a pixel value included in a current picture from a previous or following picture of the current picture using an image compression method, an intra-screen prediction technique for predicting a pixel value included in the current picture using pixel information in the current picture, and entropy encoding technique for assigning a short code to a high appearance frequency and a long code to a low appearance frequency. Image data that is effectively compressed using such image compression techniques may be transmitted or stored.

Image processing by the video device includes encoding and decoding by a video engine and managing of header information and reference picture list by firmware being a kind of software.

SUMMARY

Example embodiments of inventive concepts provide an image processing method and a video device capable of improving an image processing speed at encoding or decoding.

At least one example embodiment of inventive concepts is directed to an image processing method which includes storing a number of pictures into a buffer, parsing header information of a current image of the number of pictures and managing a reference picture list of the current image while the current image is processed by a video engine based on the parsed header information.

The parsing and the managing may be performed by firmware.

The managing may include updating, by the firmware, the reference picture list of the current image if a last slice of the current image starts to be processed by the video engine.

The managing may include generating, by the firmware, the reference picture list of the current image and using, by the firmware, the reference picture list of the current image for reference picture ordering of the current image if a first slice of the current image starts to be processed by the video engine.

The method may further include decoding, by the video engine, the current image according to a decoding method.

The method may further include encoding, by the video engine, the current image according to an encoding method.

The encoding method may be one of HEVC, VP8, VP9, MPEG-2, MPEG-4, H.263, and H.264.

The image processing method may further include parsing header information of a next image of the current image while the video engine processes the current image, the parsing the header information of the next image occurring after the managing.

At least another example embodiment of inventive concepts is directed to an image processing method of a video device which includes storing a number of pictures into a picture memory, parsing header information of a current image of the number of pictures, providing a decoding command to a video engine to decode the current image and processing output information of the current image and information about a next image of the current image in parallel with a decoding operation by the video engine based on the parsed header information.

The output information of the current image may include a reference picture list and the information about the next image comprises header information.

The method may further include restoring a reference picture list of the current image to a reference picture list of a previous image if an error is generated during the processing.

The method may further include updating the reference picture list of the current image if a last slice of the current image starts to be processed by the video engine.

The managing includes generating, by firmware of the video device, the reference picture list of the current image and using, by the firmware, the reference picture list of the current image for reference picture ordering of the current image if a first slice of the current image starts to be processed by the video engine.

Still at least another example embodiment of inventive concepts is directed to a video device which includes a buffer, a video engine, and a controller. The buffer may store a plurality of pictures input, and the video engine may encode or decode an image of the pictures. The controller may include firmware configured to parse header information of the image and manage a reference picture list. The controller may parse header information of a current image of the pictures. The controller may manage a reference picture list of the current image while the video engine processes the current image based on the parsed header information.

The controller may further parse header information of a next image of the current image when managing of the reference picture list of the current image is completed.

The video engine may encode the current image according to a predetermined encoding method.

The reference picture list of the current image may be restored to a reference picture list of a previous image when an error is generated at the video engine in processing the current image.

The controller may generate and store the reference picture list of the current image when a last slice of the current image starts to be processed by the video engine.

At least another example embodiment discloses an image processing method including obtaining at least one slice of a frame, processing, by hardware, the at least one slice and managing, by firmware, a reference picture list associated with the frame during the processing.

In an example embodiment, the method includes determining whether the at least one slice is a last slice of the frame, the managing being based on the determining.

In an example embodiment, the managing manages the reference picture list if the at least one slice is the last slice of the frame.

In an example embodiment, the managing includes updating the reference picture list.

In an example embodiment, the processing is one of encoding a picture of the frame and decoding the picture of the frame, the picture including the at least one slice.

According to at least one example embodiment of inventive concepts, since a hardware operation and a firmware operation are performed in parallel, an image processing speed is improved. In other words, operating performance of a video device is provided.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
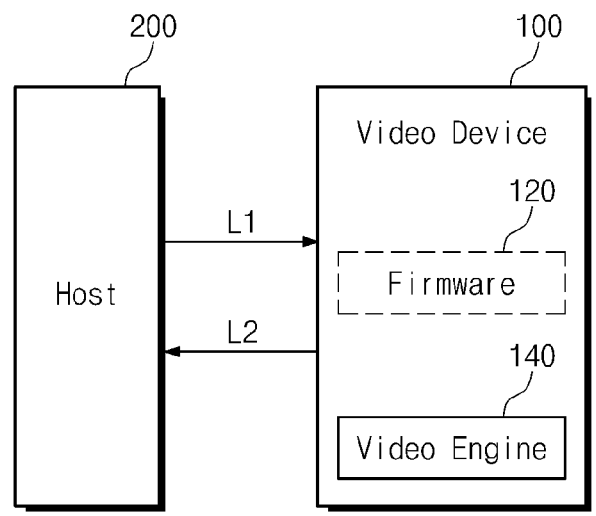
FIG. 1 is a block diagram schematically illustrating a video system according to an example embodiment of inventive concepts.

Example embodiments will be described in detail with reference to the accompanying drawings. Inventive concepts, however, may be embodied in various different forms, and should not be construed as being limited only to the illustrated embodiments. Rather, example embodiments are provided as examples so that this disclosure will be thorough and complete, and will fully convey the concept of inventive concepts to those skilled in the art. Accordingly, known processes, elements, and techniques are not described with respect to some of example embodiments of inventive concepts. Unless otherwise noted, like reference numerals denote like elements throughout the attached drawings and written description, and thus descriptions will not be repeated. In the drawings, the sizes and relative sizes of layers and regions may be exaggerated for clarity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of inventive concepts.

It will be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present.

Unless otherwise defined, all terms (including technical and scientific terms) used herein have the same meaning as commonly understood by one of ordinary skill in the art to which inventive concepts belong. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

Example embodiments disclosed herein may include their complementary embodiments. Note that a general operation of an encoder or decoder and a detail about internal circuits for performing the general operation may be skipped to prevent inventive concepts from becoming ambiguous.

FIG. 1 is a block diagram schematically illustrating a video system according to an example embodiment of inventive concepts.

Referring to FIG. 1, a video system contains a video device 100 and a host 200.

The host 200 provides the video device 100 with image input information through a line L1. The host 200 receives image output information from the video device 100 through a line L2. When receiving the image output information, the host 200 displays an image. The lines L1 and L2 may form a data communication channel.

The video device 100 contains a video engine 140. A controller of the video device 100 has firmware 120. The video device 100 may include a buffer for storing a plurality of pictures applied.

The video engine 140 encodes or decodes image input information, for example, an image of pictures. A picture means an image frame or a slice of a frame. For example, an image of pictures encoded may be applied in the form of video data, and an image of pictures decoded may be applied in the form of encoded video bit stream.

The firmware 120 is software run by the controller of the video device 100 and parses header information of the image to manage a reference picture list.

The firmware 120 parses header information of a current image of pictures.

Based on the parsed header information, the firmware 120 manages a reference picture list of a current image while the current image is processed by the video engine 140.

When a hardware operation is carried out, that is, during an encoding or decoding operation by the video engine 140, the firmware 120 may previously manage a reference picture list of a current image or parse header information of a next image, without waiting for completion of encoding or decoding.

As described above, a hardware operation and a firmware operation may be carried out in parallel, thereby improving an image processing speed. This means that operating performance of the video device 100 is improved.

Figure 2:
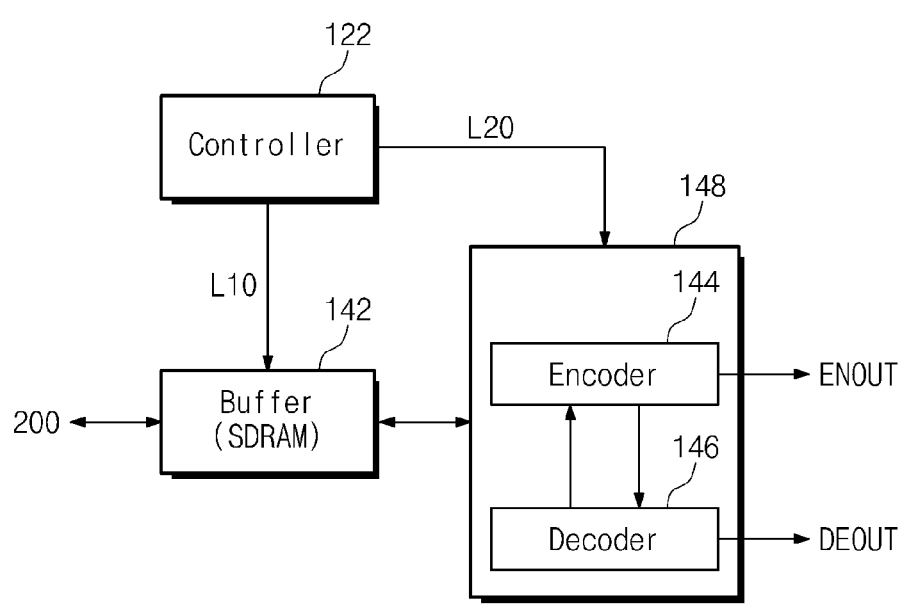
FIG. 2 is a block diagram schematically illustrating a video device of FIG. 1, according to an example embodiment of inventive concepts.

FIG. 2 is a block diagram schematically illustrating a video device of FIG. 1, according to an example embodiment of inventive concepts.

Referring to FIG. 2, a video device 100 contains a controller 122 equipped with firmware, a buffer 142, and a video engine unit 148.

The controller 122 may include a part of the video engine 140 of FIG. 1 as well as the firmware 120 of FIG. 1. The video engine unit 148 that is formed of an encoder 144 and a decoder 146 may be included in a configuration of the video engine 140 as a part.

The controller 122 is connected with the buffer 142 through a line L10 and with the video engine unit 148 through a line L20. The buffer 142 may be implemented with an SDRAM. The controller 122 may be connected with the host 200 of FIG. 1 through the buffer 142. However, the scope and spirit of inventive concepts may not be limited thereto. For example, the controller 122 may be connected directly with the host 200 to exchange data with the host 200.

The controller 122 may include hardware, firmware, hardware executing software or any combination thereof. Such existing hardware may include one or more Central Processing Units (CPUs), digital signal processors (DSPs), application-specific-integrated-circuits (ASICs), field programmable gate arrays (FPGAs) computers or the like configured as special purpose machines to perform the functions of the controller 122.

In the event where the controller 122 is a processor executing software, the controller 122 is configured as a special purpose machine to execute the software, stored in a computer-readable storage medium, to perform the functions of the controller 122.

An encoding output ENOUT included in image output information is an encoding result of the encoder 144, and a decoding output DEOUT included in the image output information may be a decoding result of the decoder 146.

Figure 3:
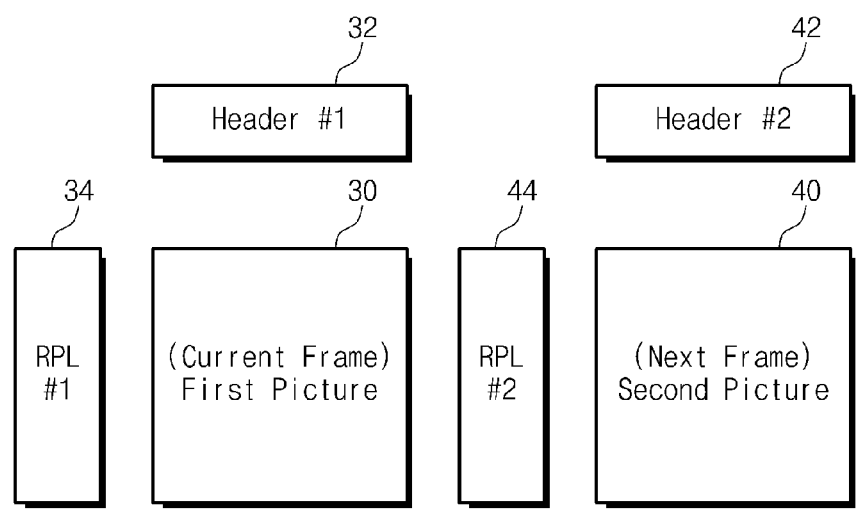
FIG. 3 is a block diagram schematically illustrating a structure of pictures associated with FIG. 2.

FIG. 3 is a block diagram schematically illustrating a structure of pictures associated with FIG. 2.

Referring to FIG. 3, there are in detail illustrated two pictures. The two pictures provided as image input information include first and second pictures 30 and 40, first and second header information 32 and 42, and first and second reference picture lists (RPLs) 34 and 44.

In the event that the first picture 30 is provided as an image of pictured to be decoded, the first header information 32 may include header information associated with the first picture 30, and the first reference picture list 34 includes reference picture information associated with the first picture 30.

Similarly, if the second picture 40 is provided as an image of pictured to be decoded, the second header information 42 may include header information associated with the second picture 40, and the second reference picture list 44 includes reference picture information associated with the second picture 40.

Figure 4:
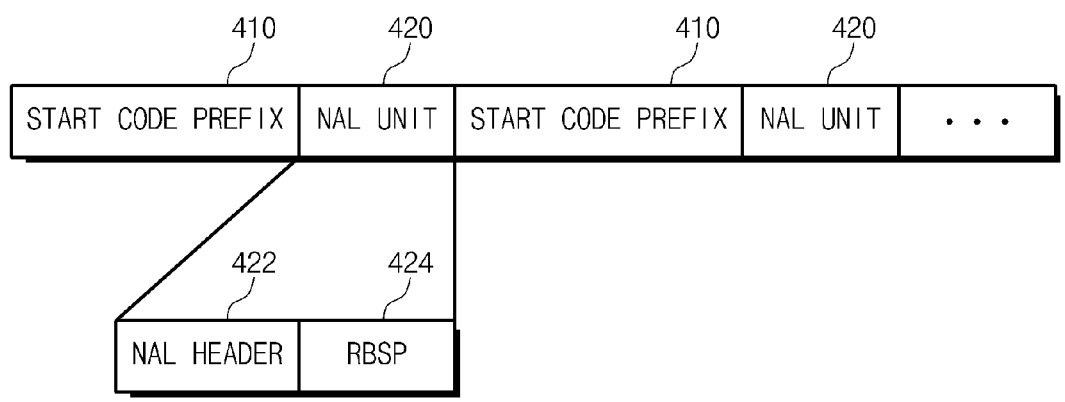
FIG. 4 is a diagram illustrating an example structure of a bit stream associated with FIG. 3.

Here, an image of pictures to be decoded may be provided in the form of bit stream as illustrated in FIG. 4.

FIG. 4 is a diagram illustrating an example structure of a bit stream associated with FIG. 3.

As illustrated in FIG. 4, a bit stream has a structure defined in H.264. However, inventive concepts are not limited to a structure of FIG. 4.

In H.264, a series of bits constituting combined data for forming a bit stream means expression of coded pictures and one or more video sequences. The bit stream may conceptually include a NAL (Network Abstraction Layer) unit stream or a byte stream.

The bit stream is formed of a series of byte stream NAL unit syntax structures. A byte stream NAL unit syntax structure contains a start code prefix 410 and an NAL unit 420. The start code prefix 410 may have a 3-byte value of "0x000001". The NAL unit 420 is formed of an NAL header 422 informing a data type and an RBSP (Raw Byte Sequence Payload) 424.

The NAL header 422 may include information notifying whether a coded picture included in an NAL unit is a reference picture. The NAL header 422 may include a field named "nal_ref_idc". That a value of the "nal_ref_idc" field is "0" means that the coded picture is a non-reference picture. That a value of the "nal_ref_idc" field is not "0" means that the coded picture is a reference picture.

The RBSP 424 may include a slice header and slice data. The slice header may include the following information: a slice type slice_type and a frame number frame_num. In the H.264 standard, the frame number is used as a unique identifier for a reference frame. For example, if a third frame of five frames is a non-reference frame, the frame number may be set to have 1 (reference frame), 2 (reference frame), 3 (non-reference frame), 3 (reference frame), and 4 (reference frame). That is, reference frames have different frame numbers. The slice may include the integer number of macro blocks. According to the H.264 standard, a decoder which receives a bit stream may perform a picture skip function using information of the NAL header 422 indicating whether or not of a reference.

Figure 5:
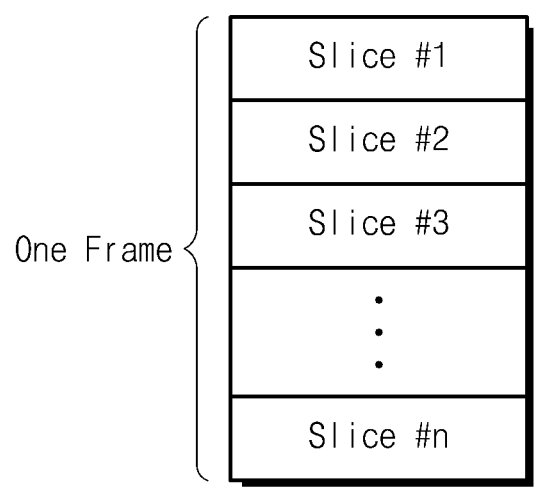
FIG. 5 is a diagram schematically illustrating a structure of an image frame associated with FIG. 3.

FIG. 5 is a diagram schematically illustrating a structure of an image frame associated with FIG. 3.

Referring to FIG. 5, one image frame contains a plurality of slices. Each slice forms a picture as illustrated in FIG. 3. In this case, header information and a reference picture list corresponding to each picture exist. Accordingly, one picture may be a frame or a slice.

Figure 6:
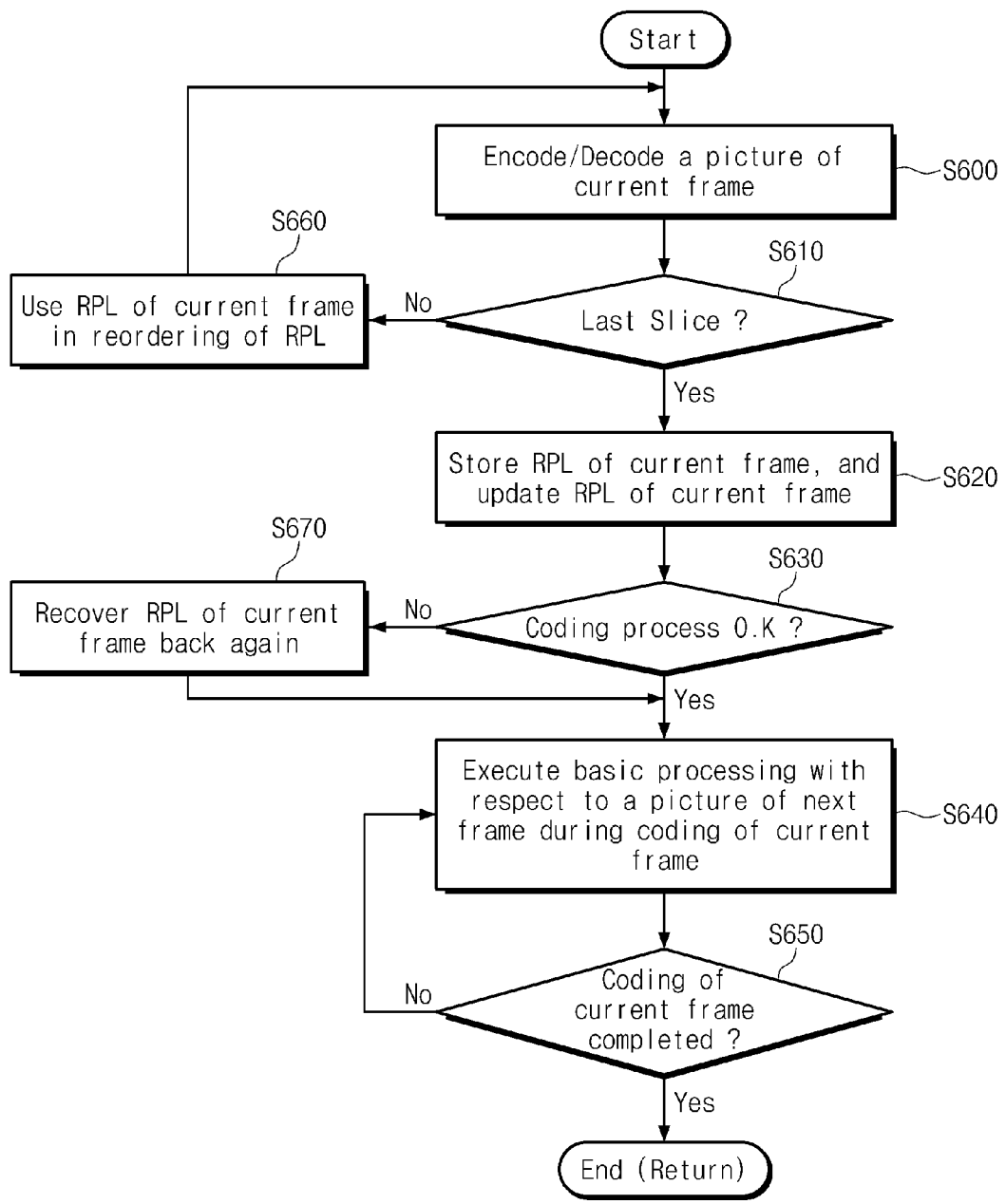
FIG. 6 is a flowchart of an image processing method according to an example embodiment of inventive concepts.

FIG. 6 is a flowchart of an image processing method according to an example embodiment of inventive concepts.

Referring to FIG. 6, in step S600, the controller 122 equipped with the firmware 120 decodes or encodes the first picture 30. For example, the first picture 30 may be one frame or one slice. In FIG. 6, an example embodiment of inventive concepts is exemplified as the first picture 30 being 1 frame having a plurality of slices. Accordingly, in step S600, there is encoded or decoded a picture of a current frame.

In S610, there is determined whether encoding or decoding is performed with respect to the last slice in the 1 frame. Here, the encoding or decoding of the first picture 30 may be performed by the video engine 140 of FIG. 1 in hardware. The firmware 120 may determine whether the video engine 140 starts to encode or decode the last slice.

If encoding or decoding about the last slice starts, step S620 executed by the firmware 120 is performed in parallel with encoding or decoding by the video engine 140. In step S610, a reference picture list RPL of a current frame is stored and updated. That is, the firmware 120 stores and updates the reference picture list immediately without waiting for an encoding or decoding result.

In an example embodiment of inventive concepts, there is exemplified an operation for determining whether encoding or decoding about the last slice starts. However, the scope and spirit of inventive concepts may not be limited thereto. For example, updating of a reference picture list and a start of a first slice are simultaneously performed if the controller 122 writes up a copy list of a reference picture list and uses the copy list to process the first picture 30.

In step S630, there is determined whether the encoding or decoding operation is performed without errors. If an error occurs in decoding, in step S670, the updated reference picture list is restored to a previous reference picture list.

Meanwhile, the firmware 120 generates a reference picture list of the current image when a first slice of the slices starts to be processed by the video engine 140. In this case, the generated reference picture list can be used to order reference pictures of the current image.

As a consequence of determining that the encoding or decoding operation is performed without errors, the method proceeds to step S640. In step S640, the firmware 120 executes basic processing about a picture of a next frame while encoding or decoding about the current frame is executed. Here, the basic processing may include parsing header information about a picture of a next frame.

In step S650, there is determined whether picture encoding or decoding about a current frame is completed. If completed, the method proceeds to step S600 to process a next frame.

For decoding, a header information parsing step, a decoding step, and a reference picture list update step are sequentially performed. The header information parsing step and the reference picture list update step are performed by the firmware 120, and the decoding step is performed by the video engine 140 that receives a decoding command from the firmware 120. Here, the encoding or decoding operation performed by the video engine 140 takes a longer time than an operation performed by the firmware 120. Accordingly, the firmware 120 updates a reference picture list in parallel with an operation by the video engine 140, without waiting until an encoding or decoding operation by the video engine 140 is completed. In other words, it is possible to reduce a time taken to process the whole image.

Figure 7:
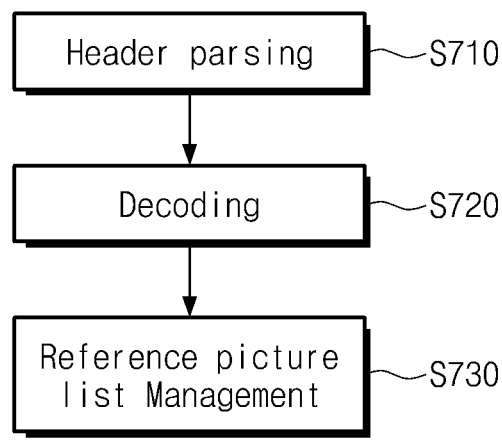
FIG. 7 is a flowchart illustrating a procedure for processing pictures of FIG. 3 according to an example embodiment of inventive concepts.

FIG. 7 is a flowchart illustrating a procedure for processing the pictures of FIG. 3.

Referring to FIG. 7, there is illustrated a picture processing procedure performed upon decoding.

First, header information is parsed in step S710, and decoding is performed in step S720. In step S730, a reference picture list is managed. Here, managing of the reference picture list may mean including a storage operation, an update operation, or a recovery operation.

In FIG. 7, steps S710 and 730 are performed by the firmware 120, and step S720 is performed by a hardware video engine 140. The firmware 120 performs an operation of step S730 in parallel with an operation of step S720 without waiting for whether an operation of step S720 is completed, thereby reducing a time taken to process an image.

Figure 8:
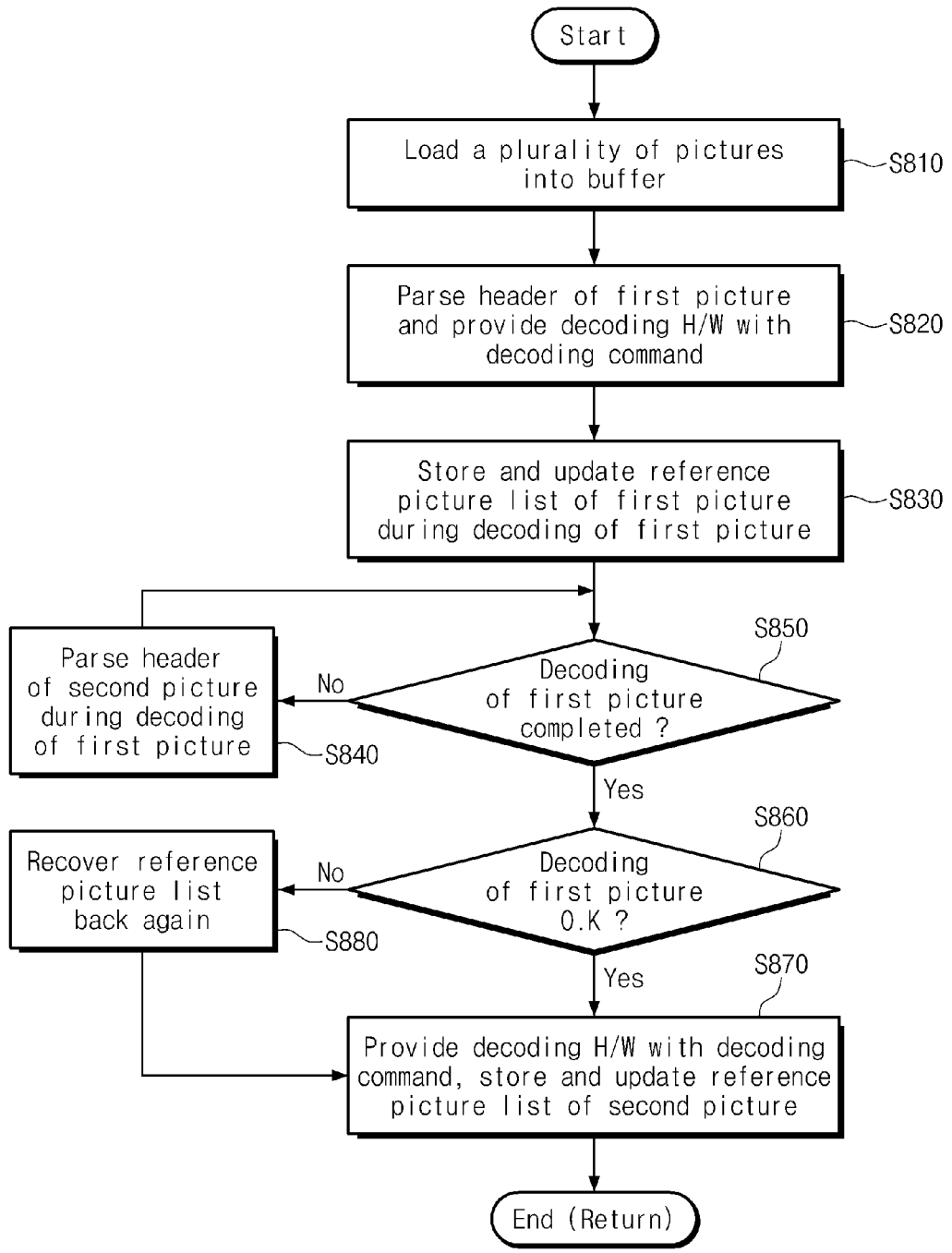
FIG. 8 is a flowchart of an image decoding method according to FIG. 7 according to an example embodiment of inventive concepts.

FIG. 8 is a flowchart of an image decoding method according to FIG. 7.

Referring to FIG. 8, the controller 122 equipped with the firmware 120 for execution of step S710 of FIG. 7, in step S810, loads a plurality of pictures from the host 200 onto the buffer 142. Here, one picture may mean a frame.

The controller 122, in step S820, parses header information of the first picture 30 and provides a hardware video engine 140 with a decoding command based on the parsed header information.

The controller 122 performs step S830 without waiting for a decoding end by the video engine 140. Step S830 may include storing and updating a reference picture list of the first picture 30 during decoding of the first picture 30. The controller 122 additionally performs step S840 only if decoding by the video engine 140 is not ended even though step S830 is completed. Step S840 includes parsing header information of a second picture during decoding of the first picture.

In step S850, there is determined by the controller 122 whether decoding of the first picture is completed. In step S860, whether the decoding of the first picture is passed without errors is determined by the controller 122. Information about decoding success or errors may be obtained from the video engine 140.

When an error occurs upon decoding, in step S880, the updated reference picture list is restored by the controller 122 from a previous reference picture list.

As a consequence of determining that the decoding of the first picture is passed, the method proceeds to step S870, in which the firmware 120 provides a decoding command to the video engine 140 based on the header information of the second picture. An operation of storing and updating a reference picture list of the second picture is performed in parallel with a decoding operation by the video engine 140.

Accordingly, the firmware 120 performs an operation of updating a reference picture list or parsing header information of a next picture in parallel with an operation by the video engine 140, without remaining at an idle state until the decoding operation by the video engine 140 is completed. This means that a time taken to process the whole image is shortened.

Figure 9:
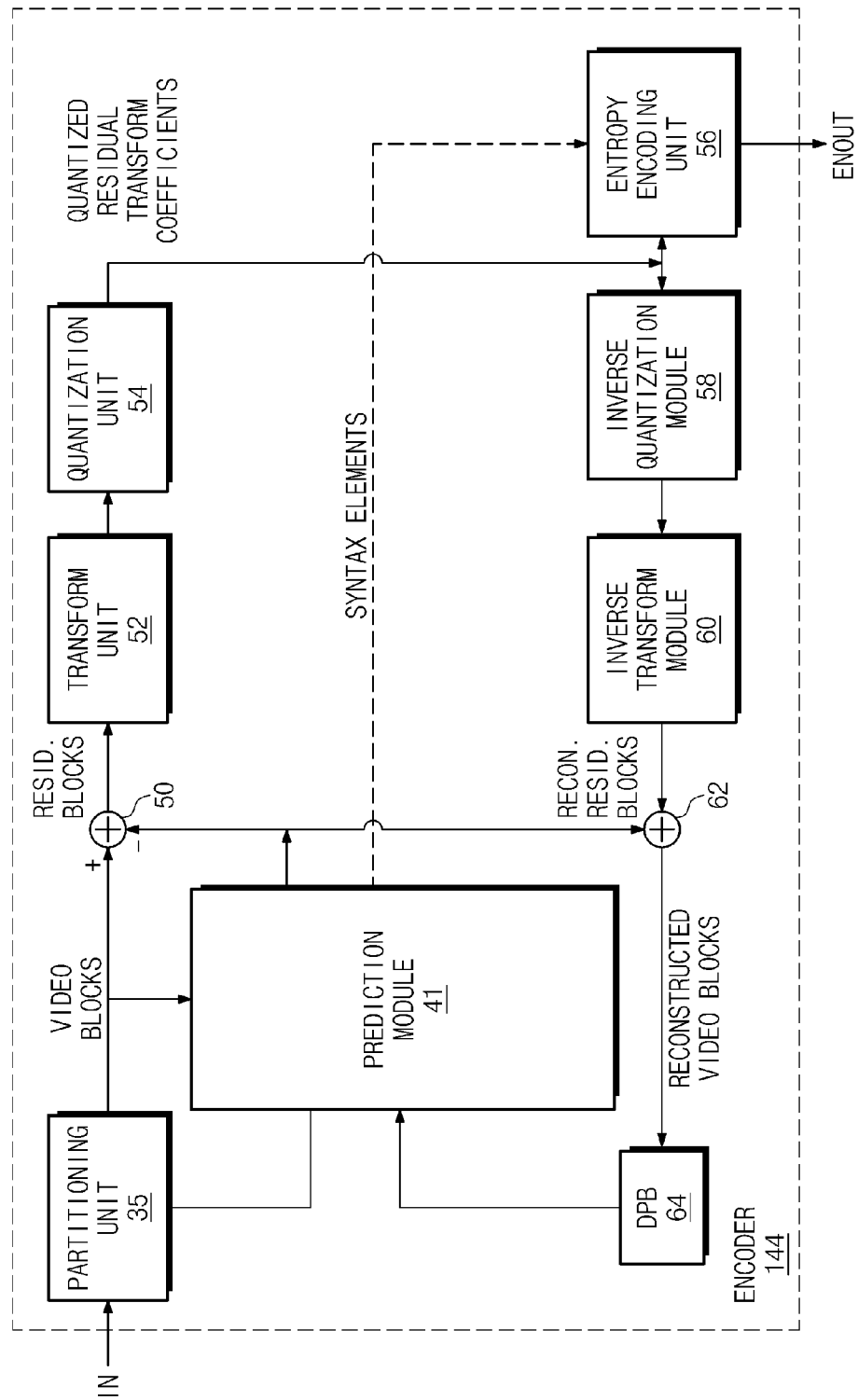
FIG. 9 is a block diagram schematically illustrating an encoding of FIG. 2 according to an example embodiment of inventive concepts.

FIG. 9 is a block diagram schematically illustrating an encoding of FIG. 2.

Referring to FIG. 9, the encoder 144 may perform intra-coding or inter-coding of video blocks in video pictures.

The intra-coding is based on spatial prediction to reduce or remove spatial redundancy of a video in a predetermined video picture. The inter-coding is based on temporal prediction to reduce or remove temporal redundancy of a video in adjacent pictures of a video sequence. The intra-mode ("I" mode) may designate any one of various space-based compression modes. Inter-modes such as unidirectional prediction ("P" mode) and bidirectional prediction ("B" mode) may designate any one of various time-based compression modes.

Referring to FIG. 9, the encoder 144 contains a partitioning unit 35, a prediction module 41, a Decoding Picture Buffer (DPB) 64, a summer 50, a transform module 52, a quantization unit 54, and an entropy encoding unit 56.

The prediction module 41 may include a motion estimation unit, a motion compression unit, and an intra-prediction unit.

To reconfigure a video block, the encoder 144 also includes an inverse quantization unit 58, an inversion transform module 60, and a summer 62. The encoder 144 may further include a deblocking filter for filtering block boundaries to remove blockiness artifacts in the reconfigured video. The deblocking filter may be connected to an output stage of the summer 62.

As illustrated in FIG. 9, the encoder 144 may receive an encoded slice or a current video block in a video picture. In example embodiments, a picture or a slice may be divided from a plurality of video blocks or coding units (CUs), but it may also include prediction units (PUs) or transform units (TUs).

One of coding modes about a current video block, that is, an intra-mode or an inter-mode is selected based on error results.

The prediction module 41 provides an intra-coded block or an inter-coded block to the summer 50 to generate residual block data. The prediction module 41 provides a resultant intra-coded block or an inter-coded block to the summer 50 to reconfigure an encoded block to be used as a reference picture.

An intra-prediction unit of the prediction module 41 may provide spatial compression by performing intra-prediction coding of a current video block about one or more adjacent blocks in the same picture or slice as a current block to be coded.

A motion estimation unit and a motion compensation unit in the prediction module 41 may provide temporal compression by performing inter-prediction coding of a current video block about one or more reference pictures.

The motion estimation unit and the motion compensation unit may be integrated in one chip, but they are separately illustrated for the sake of description.

Motion estimation of the motion estimation unit may be a process for generating motion vectors, and the motion vectors may estimate motions about video blocks. The motion vector, for example, may indicate a displacement of a video block in a current video picture about a prediction block in the reference picture.

The prediction block may be a block that is found as being closely identical to a video block to be coded in terms of a pixel difference. The pixel difference may be determined by a sum of absolute difference (SAD), a sum of square difference (SSD), or other difference matrixes.

The encoder 144 calculates values of sub-integer pixel positions of reference pictures stored at the DPB 64. For example, the encoder 144 may calculate values of ¼ pixel locations, ⅛ pixel locations, or other fractional pixel locations of the reference picture. Accordingly, the motion estimation unit performs motion searching about all pixel locations and fractional pixel locations to output a motion vector having fractional pixel accuracy.

The motion estimation unit sends the calculated motion vector to the entropy encoding unit 56 and the motion compensation unit. The motion compensation that the motion compensation unit performs may accompany fetching or generating a prediction block based on the motion vector determined by the motion estimation.

When receiving the motion vector about a current video block, the motion compensation unit may find a prediction block that the motion vector points out.

The encoder 144 makes a residual video block forming pixel difference values by subtracting a pixel value of the prediction block from pixel values of the current video block. The pixel difference values constitute residual data about a block and include both luma and chroma difference components. The summer 50 indicates a component(s) for performing the subtraction operation.

After the motion compensation unit generates a prediction block about a current video block, the encoder 144 forms a residual video block by subtracting a prediction block from a current video block. The transform module 52 forms one or more transform units (TUs) from the residual block. The transform module 52 applies a discrete cosine transform (DCT) or transform such as conceptually similar transform to the TU to generate a video block including residual transform coefficients. The residual block is transformed from a pixel domain to a transform domain such as a frequency domain by the transform.

The transform module 52 sends the transform coefficients to the quantization unit 54. The quantization unit 54 quantizes the transform coefficients to make a bit rate smaller. A quantization process may reduce a bit depth associated with all or a part of coefficients. A quantization level may be corrected by adjusting a quantization parameter. The quantization unit 54 scans a matrix including the quantized transform coefficients.

After quantizing, the entropy encoding unit 56 entropy codes the quantized transform coefficients. For example, the entropy encoding unit 56 may perform Context-Adaptive Variable Length Coding (CAVLC), Context-Adaptive Binary Arithmetic Coding (CABAC), Probability Interval Partitioning Entropy (PIPE), or other entropy encoding. Following the entropy coding of the entropy encoding unit 56, the encoded bit stream is sent to a decoder 146 or may be archived for next transmission or extraction.

The inverse quantization unit 58 and the inverse transform module 60 may reconfigure a residual block of a pixel domain as a reference block of a reference picture for later use, through inversion quantization and inverse transform. The motion compensation unit calculates the reference block by adding the residual block to a prediction block of one of reference pictures. The motion compensation unit also applies one or more interpolation filters to the reconfigured residual block to calculate sub-integer pixel values to be used at motion estimation. The summer 62 adds the reconfigured residual block to a motion-estimated prediction block generated by the motion compensation unit to generate a reference picture list to be stored at the DPB 64. The reference picture list may be a reference block for inter-predicting a block of a following video picture.

As described in FIG. 9, an encoding operation of the encoder 144 is performed in parallel with and an operation where the firmware 120 generates header information or a reference picture list, thereby speeding up an image processing speed in encoding. An encoding method according to an example embodiment of inventive concepts may be one of HEVC, VP8, VP9, MPEG-2, MPEG-4. H.263, and H.264.

Figure 10:
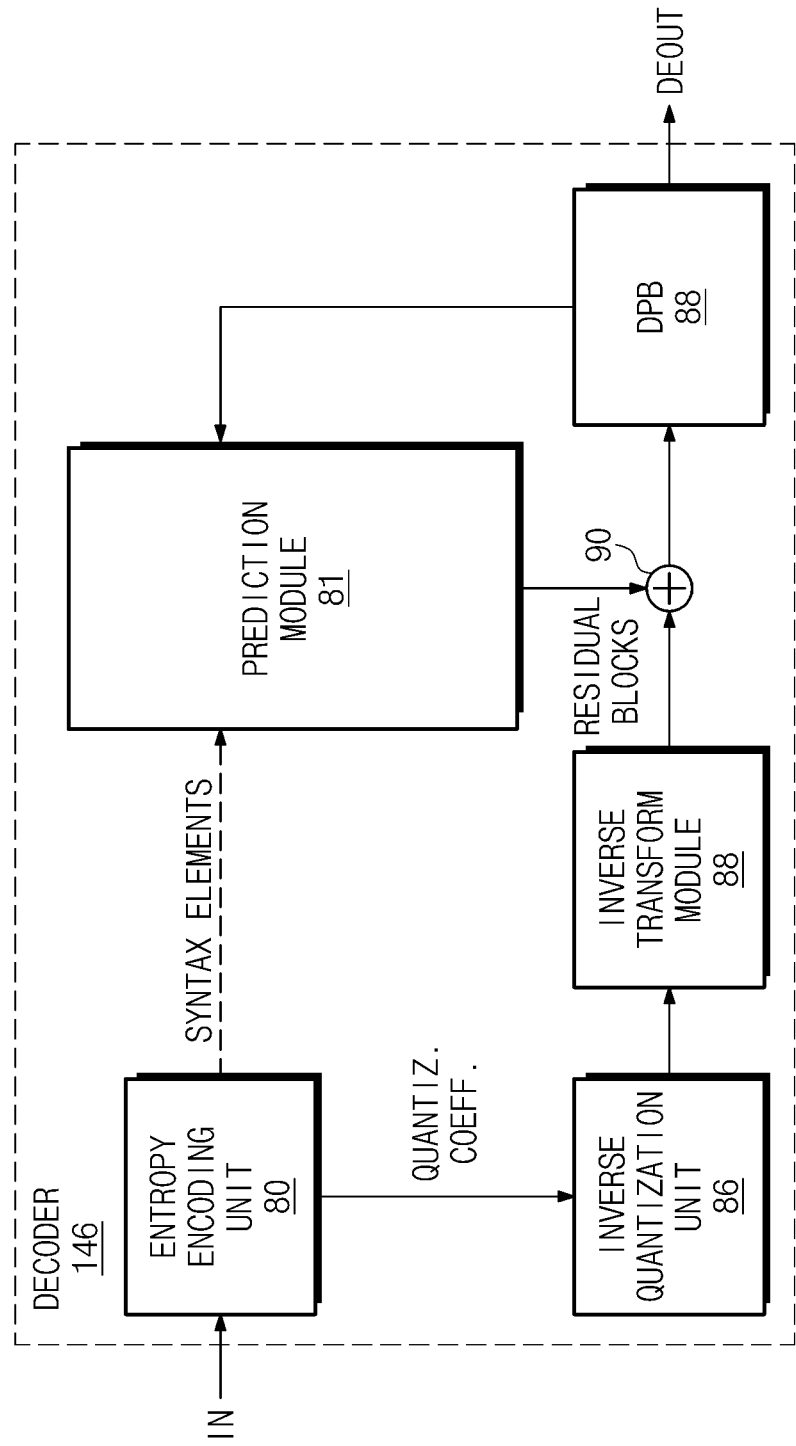
FIG. 10 is a block diagram schematically illustrating a decoder of FIG. 2 according to an example embodiment of inventive concepts.

FIG. 10 is a block diagram schematically illustrating a decoder of FIG. 2.

Referring to FIG. 10, the decoder 146 contains an entropy decoding unit 80, a prediction module 81, an inverse quantization unit 86, an inverse transform unit 88, a summer 90, and a Decoding Picture Buffer (DPB) 92.

The prediction module 81 may contain a motion compensation unit and an intra-prediction unit. The decoder 146 performs a decoding operation in reverse order of an encoding operation described with reference to the encoder 144.

During a decoding process, the decoder 146 receives phrase elements indicating encoding information and an encoded video bit stream including an encoding video block, from the encoder 144.

The entropy decoding unit 80 of the decoder 146 entropy decodes a bit stream to generate quantized coefficients, motion vectors, and other prediction phrases. The entropy decoding unit 80 sends the motion vectors and the other prediction phrases to the prediction module 81.

The decoder 146 may receive phrase elements at a video prediction unit level, a video coding level, a video slice level, a video picture level, and/or a video sequence level.

If a video slice is coded as an intra-coded slice, an intra-prediction unit of the prediction module 81 generates prediction data about a video block of a current video picture based on data from blocks decoded before a current picture and a signaled intra-prediction mode. When a video block is inter-predicted, a motion compensation unit of the prediction module 81 generates prediction blocks about the video block of the current video picture based on a prediction phrase received from the entropy decoding unit 80 and a motion vector or vectors.

The motion compensation unit decides prediction information about the current video block by parsing the motion vectors and the prediction phrases and generates prediction blocks about the current video block being decoded using the prediction information.

The inverse quantization unit 86 de-quantizes quantized transform coefficients that are provided through a bit stream and are decoded by the entropy decoding unit 80. The de-quantization process may include the use of a quantization parameter calculated by the encoder 144 with respect to at least one CU or each video block to decide a quantization level and a de-quantization level to be applied.

To generate residual blocks at a pixel domain, the inverse transform module 88 applies inverse transform (e.g., inverse DCT, inverse-integer transform, or conceptually similar inverse transform) with respect to transform coefficients.

After the motion compensation unit generates a prediction block about a current video block based on motion vectors and prediction phrase elements, the decoder 146 generates a decoded video block by summing residual blocks from the inverse transform module 88 and corresponding prediction blocks generated by the motion compensation unit.

The summer 90 indicates a component(s) for performing the above-described addition operation. If necessary, a deblocking filter for filtering decoded blocks may be also applied to remove blockiness artifacts. Afterwards, the decoded video blocks are stored into the DPB 92. The decoded video blocks stored into the DPB 92 provides a reference block of reference pictures about following motion compensation. The DPB 92 also generates a decoded video for a display on a display device.

As described with reference to FIG. 10, a decoding operation of the decoder 146 is performed in parallel with operations where the firmware 120 manages a reference picture list and parses header information of a next picture, thereby speeding up an image processing speed in decoding.

Figure 11:
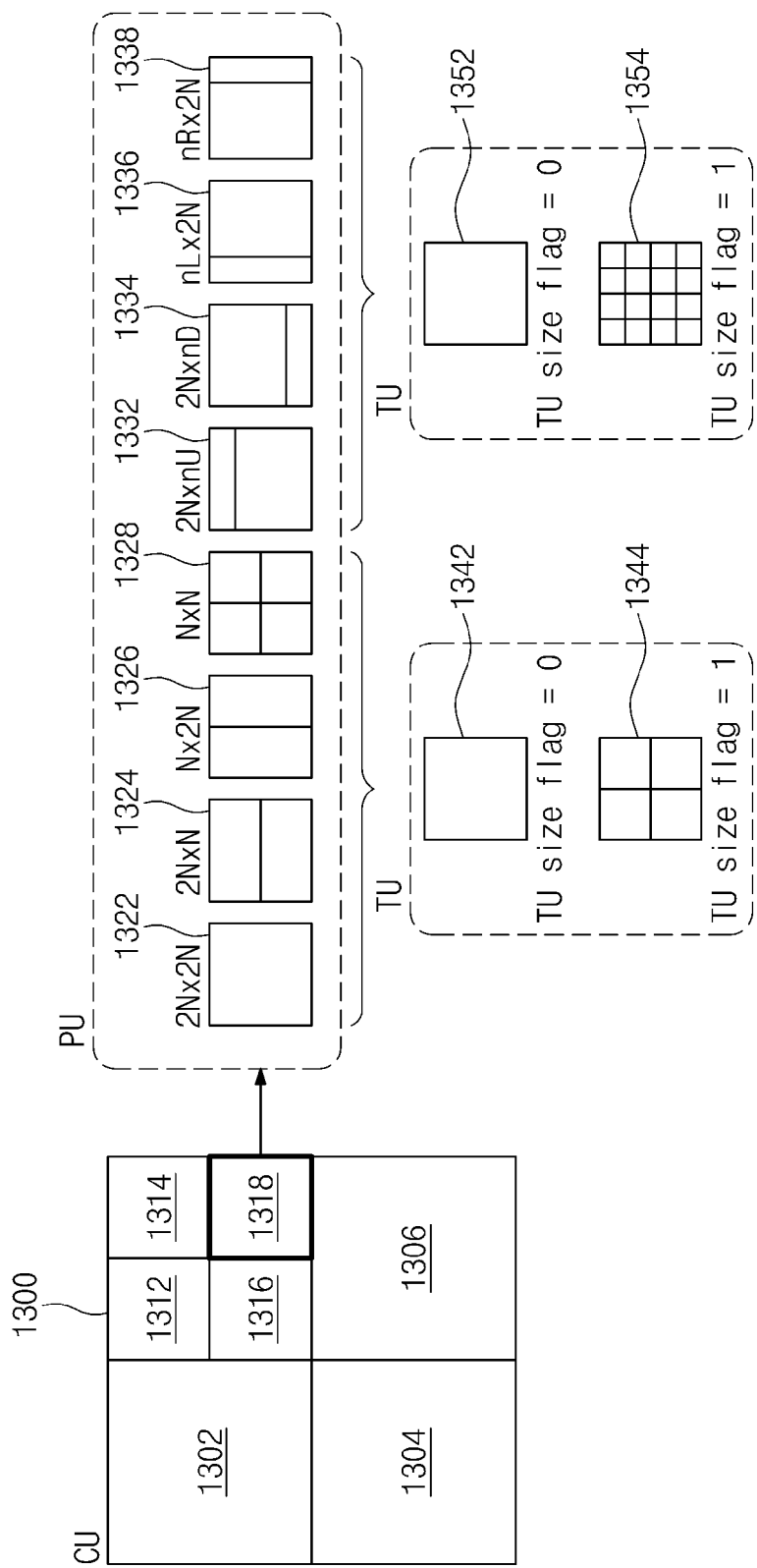
FIG. 11 is a diagram schematically illustrating an encoding unit, a prediction unit, and a transform unit applied to process images, according to an example embodiment of inventive concepts.

FIG. 11 is a diagram schematically illustrating relation between an encoding unit, a prediction unit, and a transform unit applied to process images, according to an example embodiment of inventive concepts.

Referring to FIG. 11, the maximum encoding unit 1300 contains depth encoding units 1302, 1304, 1306, 1312, 1314, 1316, and 1318. Since the encoding unit 1318 is a depth encoding unit, division information may be set to have a value of "0". Partition mode information of the encoding unit 1318 having a size of "2N×2N" may be set to have one of "2N×2N" (1322), "2N×N" (1324), "N×2N" (1326), "N×N" (1328), "2N×nU" (1332), "2N×nD" (1334), "nL×2N" (1336), and "nR×2N" (1338).

Transform unit partition information (TU size flag) is a kind of transform index, and the size of transform unit corresponding to the transform index may vary with a prediction unit type or a partition mode of an encoding unit. For example, in the event that partition mode information is set to have one of "2N×2N" (1322), "2N×N" (1324), "N×2N" (1326), and "N×N" (1328), the transform unit 1342 having a size of "2N×2N" is set when the transform unit partition information (TU size flag) is "0", and the transform unit 1344 having a size of "N×N" is set when the transform unit partition information (TU size flag) is "1".

In the event that the partition mode information is set to have one of "2N×nU" (1332), "2N×nD" (1334), "nL×2N" (1336), and "nR×2N" (1338), the transform unit 1352 having a size of "2N×2N" is set when the transform unit partition information (TU size flag) is "0", and the transform unit 1354 having a size of "N/2×N/2" is set when the transform unit partition information (TU size flag) is "1".

The transform unit partition information (TU size flag) is a flag having a value of "0" or "1". However, the scope and spirit of inventive concepts may not be limited thereto. For example, a value of the transform unit partition information (TU size flag) may increase according to setting to have 0, 1, 2, 3 . . . , and it may be partitioned stepwise. The transform unit partition information may be used as an example of the transform index. In this case, magnitude of the transform unit to be actually used may be expressed if the transform unit partition information is used together with the maximum of the transform unit and the minimum size of the transform unit. An encoder 144 shown in FIG. 2 may encode size information of the maximum transform unit, size information of the minimum transform unit, and partition information of the maximum transform unit.

A decoder 146 may use size information of the maximum transform unit, size information of the minimum transform unit, and partition information of the maximum transform unit in coding videos.

For example, if the size of current encoding unit is "64×64" and the size of maximum transform unit is "32×32", the transform unit is set to have the size of "32×32" when partition information of the transform unit is "0", to have the size of "16×16" when partition information of the transform unit is "1", and to have the size of "8×8" when partition information of the transform unit is "2".

In other example embodiments, if the size of current encoding unit is "32×32" and the size of maximum transform unit is "32×32", the transform unit is set to have the size of "32×32" when partition information of the transform unit is "0". Partition information of the transform unit may not be set any longer because the size of transform unit is not reduced to be smaller than "32×32".

In still other example embodiments, if the size of current encoding unit is "64×64" and partition information of the maximum transform unit is "1", partition information of the transform unit is "0" or "1", and it is impossible to set partition information of other transform unit.

Image data of a spatial area is encoded by encoding units of a tree structure according to a video encoding technique based on the encoding units of the tree structure. Decoding is performed every maximum encoding unit according to a video decoding technique based on the encoding units of the tree structure and a picture and a video being a picture sequence are restored. The restored video may be reproduced, stored at a storage medium, or transmitted through a network.

As described above, firmware may be made by a program and may be implemented at a general-purpose digital computer, which executes the program, using a computer-readable recoding medium. The computer-readable recoding medium may include the following: magnetic storage medium (e.g., ROM, floppy disk, hard disk, etc.), optical readable medium (e.g., CD-ROM, DVD, etc.), or Solid State Drive (SSD).

Figure 12:
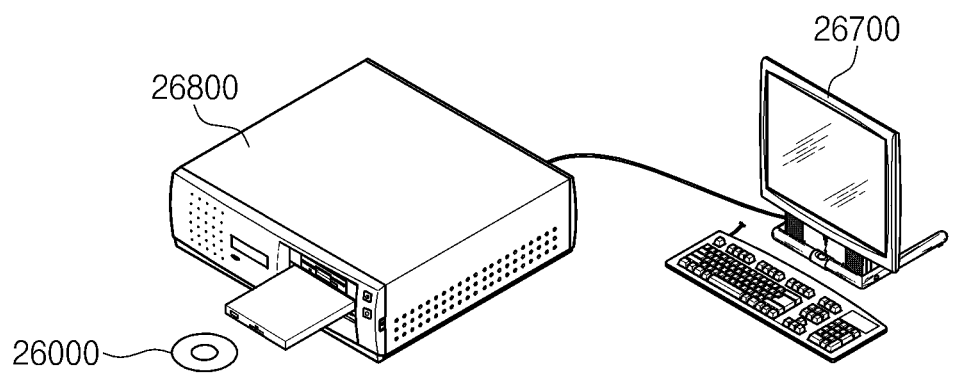
FIG. 12 is a diagram schematically illustrating an application of inventive concepts applied to a disk drive connected with a computer system.

FIG. 12 is a diagram schematically illustrating an application of inventive concepts applied to a disk drive connected with a computer system.

FIG. 12 shows a disk drive 26800 for recording and reading a program using a semiconductor memory or a disk 26000. A computer system 26700 may store a program for implementing at least one of a video encoding method or a video decoding method of inventive concepts using the disk drive 26800 or the semiconductor memory.

To execute the program stored at the disk 26000 or the semiconductor memory on the computer system 26700, the program is read from the disk 2600 through the disk drive 26800 or from the semiconductor memory and is sent to the computer system 26700.

The program for implementing at least one of a video encoding method or a video decoding method of inventive concepts may be stored at the following as well as the disk 26000: memory card, ROM cassette, and Solid State Drive (SSD).

Figure 13:
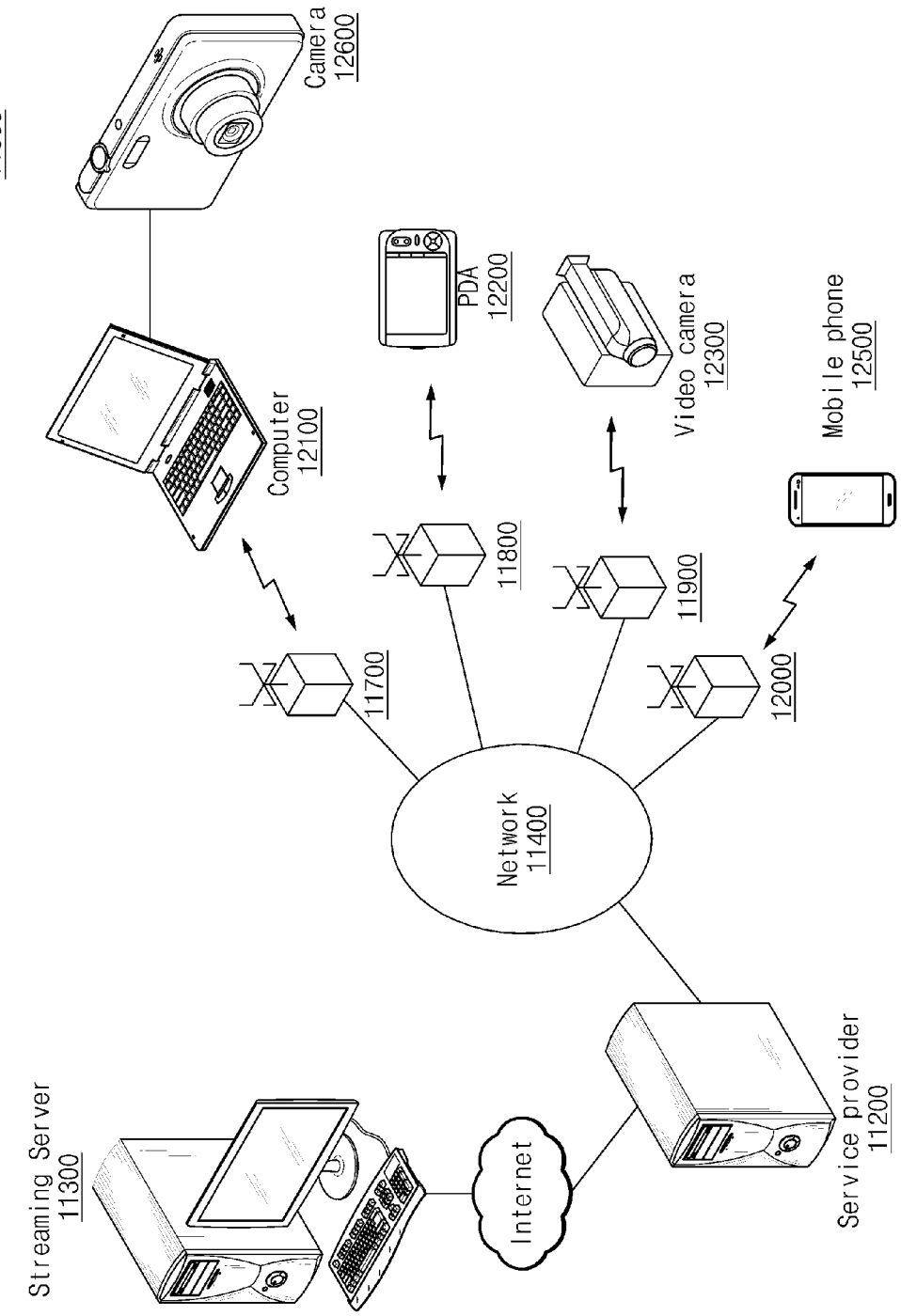
FIG. 13 is a diagram schematically illustrating an application of inventive concepts applied to a content supply system.

A system to which a video encoding method or a video decoding method according to FIG. 12 is applied is illustrated in FIG. 13.

FIG. 13 is a diagram schematically illustrating an application of inventive concepts applied to a content supply system.

FIG. 13 a content supply system 11000 for providing a content distribution service.

A service area of a communication system is divided into cells each having a predetermined size, and wireless base stations 11700, 11800, 11900, and 12000 are installed in these cells, respectively.

The content supply system 11000 contains a plurality of independent devices. For example, the independent devices, such as a computer 12100, a Personal Digital Assistant (PDA) 12200, a video camera 12300, and a mobile phone 12500, are connected to the Internet 11100 via an internet service provider 11200, a communication network 11400, and the wireless base stations 11700, 11800, 11900, and 12000.

However, the content supply system 11000 is not limited to as illustrated in FIG. 13, and devices may be selectively connected thereto. The independent devices may be directly connected to the communication network 11400, not via the wireless base stations 11700, 11800, 11900, and 12000.

The video camera 12300 is an imaging device, e.g., a digital video camera, which is capable of capturing video images. The mobile phone 12500 may employ at least one communication method from among various protocols, e.g., Personal Digital Communications (PDC), Code Division Multiple Access (CDMA), Wideband-Code Division Multiple Access (W-CDMA), Global System for Mobile Communications (GSM), and Personal Handyphone System (PHS).

The video camera 12300 may be connected to a streaming server 11300 via the wireless base station 11900 and the communication network 11400.

The streaming server 11300 allows content received from a user via the video camera 12300 to be streamed via a real-time broadcast. The content received from the video camera 12300 may be encoded using the video camera 12300 or the streaming server 11300. Video data captured by the video camera 12300 may be transmitted to the streaming server 11300 via the computer 12100.

Video data captured by a camera 12600 may also be transmitted to the streaming server 11300 via the computer 12100. The camera 12600 is an imaging device capable of capturing both still images and video images, similar to a digital camera. The video data captured by the camera 12600 may be encoded using the camera 12600 or the computer 12100. Software that performs encoding and decoding video may be stored in a computer-readable recording medium, e.g., a CD-ROM disc, a floppy disc, a hard disc drive, an SSD, or a memory card, which may be accessible by the computer 12100.

If video data is captured by a camera built in the mobile phone 12500, the video data may be received from the mobile phone 12500.

The video data may also be encoded by a large scale integrated circuit (LSI) system installed in the video camera 12300, the mobile phone 12500, or the camera 12600.

The content supply system 11000 may encode content data recorded by a user using the video camera 12300, the camera 12600, the mobile phone 12500, or another imaging device, e.g., content recorded during a concert, and transmit the encoded content data to the streaming server 11300. The streaming server 11300 may transmit the encoded content data in a type of a streaming content to other clients that request the content data.

The clients are devices capable of decoding the encoded content data, e.g., the computer 12100, the PDA 12200, the video camera 12300, or the mobile phone 12500. Thus, the content supply system 11000 allows the clients to receive and reproduce the encoded content data. Also, the content supply system 11000 allows the clients to receive the encoded content data and decode and reproduce the encoded content data in real time, thereby enabling personal broadcasting.

An encoder or a decoder of inventive concepts may be applied to encoding and decoding operations of independent devices of the content supply system 11000, thereby improving operating performance of the content supply system 11000.

Figure 14:
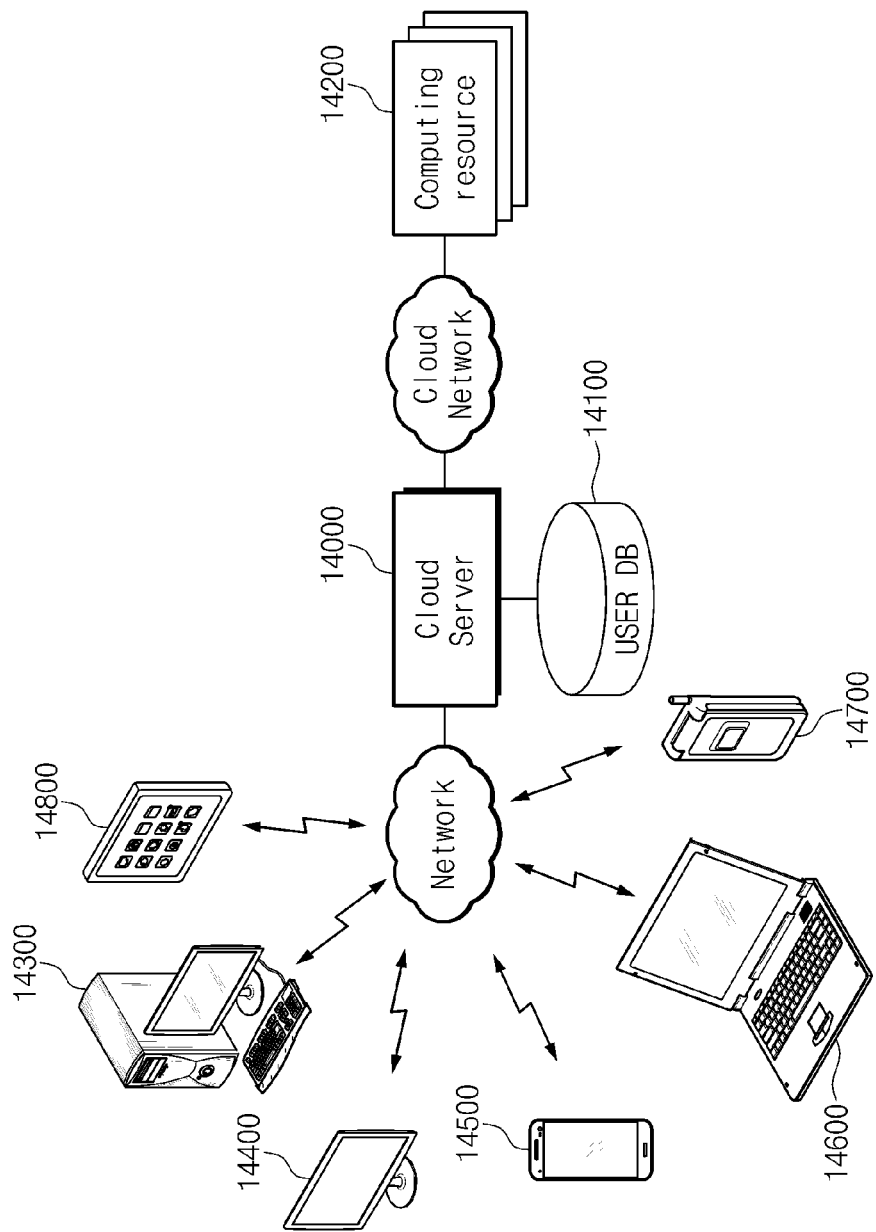
FIG. 14 is a diagram illustrating a network structure of a cloud computing system using an encoder and a decoder.

FIG. 14 is a diagram illustrating a network structure of a cloud computing system using an encoder and a decoder.

Referring to FIG. 14, there is illustrated a network structure of a cloud computing system using an encoder and a decoder.

The cloud computing system includes a cloud computing server 14000, a user database (DB) 14100, a plurality of computing resources 14200, and a user terminal.

The user terminal may be provided as a computer, a ultra-mobile personal computer (UMPC), a workstation, a net-book, a personal digital assistance (PDA), a portable computer (PC), a web tablet, a wireless phone, a mobile phone, a smart phone, a smart television, a three-dimensional television, an e-book, a portable multimedia player (PMP), a portable game console, a navigation device, a black box, a digital camera, a digital multimedia broadcasting (DMB) player, a digital audio recorder, a digital audio player, a digital picture recorder, a digital picture player, a digital video recorder, a digital video player, a device for transmitting and receiving information in a wireless environment, one of a variety of electronic devices constituting a home network, one of a variety of electronic devices constituting a computer network, one of a variety of electronic devices constituting a telematics network, a radio frequency identification (RFID) device, or one of various components constituting a computing system.

The cloud computing system provides an on-demand outsourcing service of the plurality of computing resources 14200 via a data communication network, e.g., the Internet, in response to a request from the user terminal. Under a cloud computing environment, a service provider provides users with desired services by combining computing resources at data centers located at physically different locations by using virtualization technology.

A service user does not have to install computing resources, e.g., an application, a storage, an operating system (OS), and security, into his/her own terminal in order to use them, but may select and use desired services from among services in a virtual space generated through the virtualization technology, at a desired point in time.

A user terminal of a specified service user is connected to the cloud computing server 14000 via a data communication network including the Internet and a mobile telecommunication network. User terminals may be provided cloud computing services, and particularly video reproduction services, from the cloud computing server 14000. The user terminals may be various types of electronic devices capable of being connected to the Internet, e.g., a desktop PC 14300, a smart TV 14400, a smart phone 14500, a notebook computer 14600, a portable multimedia player (PMP) 14700, a tablet PC 14800, and the like.

The cloud computing server 14000 may combine the plurality of computing resources 14200 distributed in a cloud network and provide user terminals with a result of combining. The plurality of computing resources 14200 may include various data services, and may include data uploaded from user terminals. The cloud computing server 14000 may provide user terminals with desired services by combining video database distributed in different regions according to the virtualization technology.

User information about users who have subscribed for a cloud computing service is stored in the user DB 14100. The user information may include logging information, addresses, names, and personal credit information of the users. The user information may further include indexes of videos. Here, the indexes may include a list of videos that have already been reproduced, a list of videos that are being reproduced, a pausing point of a video that was being reproduced, and the like.

Information about a video stored in the user DB 14100 may be shared between user devices. For example, when a video service is provided to the notebook computer 14600 in response to a request from the notebook computer 14600, a reproduction history of the video service is stored in the user DB 14100. When a request to reproduce this video service is received from the smart phone 14500, the cloud computing server 14000 searches for and reproduces this video service, based on the user DB 14100.

When the smart phone 14500 receives a video data stream from the cloud computing serve 14000, a process of reproducing video by decoding the video data stream is similar to an operation of the mobile phone 12500 described above with reference to FIGS. 22 and 23.

The cloud computing server 14000 may refer to a reproduction history of a desired video service, stored in the user DB14100. For example, the cloud computing server 14000 receives a request to reproduce a video stored in the user DB 14100, from a user terminal. If this video was being reproduced, then a method of streaming this video, performed by the cloud computing server 14000, may vary according to the request from the user terminal, i.e., according to whether the video will be reproduced, starting from a start thereof or a pausing point thereof.

For example, if the user terminal requests to reproduce the video, starting from the start thereof, the cloud computing server 14000 transmits streaming data of the video starting from a first frame thereof to the user terminal. If the user terminal requests to reproduce the video, starting from the pausing point thereof, the cloud computing server 14000 transmits streaming data of the video starting from a frame corresponding to the pausing point, to the user terminal.

The user terminal may include a decoder of inventive concepts. In other example embodiments, the user terminal may include an encoder of inventive concepts. Also, the user terminal may include both an encoder and decoder of inventive concepts. Thus, the operating performance of the cloud computing system is improved.

An application of the above-described video encoding method, video decoding method, encoder, and decoder is described with reference to FIG. 14. However, example embodiments where the above-described video encoding and decoding methods are stored at a storage medium or the encoder and decoder are implemented on a device are not limited to example embodiments described with reference to accompanying drawings.

While inventive concepts have been described with reference to example embodiments, it will be apparent to those skilled in the art that various changes and modifications may be made without departing from the spirit and scope of inventive concepts. Therefore, it should be understood that the above example embodiments are not limiting, but illustrative.

For example, example embodiment of inventive concepts are described mainly using encoding and decoding operations. In some cases, a detailed implementation may be changed by modifying, adding, or deleting a methodical configuration without departing from the spirit and scope of inventive concepts, thereby making it possible to perform a software operation in parallel.

What is claimed is:

1. An image processing method comprising:
   storing a number of pictures into a buffer;
   parsing header information of a current image of the pictures; and
   managing a reference picture list of the current image while the current image is processed by a video engine based on the parsed header information,
   wherein the parsing and the managing are performed by firmware and the managing includes,
   updating, by the firmware, the reference picture list of the current image if a last slice of the current image starts to be processed by the video engine.

2. The image processing method of claim 1, wherein the managing the reference picture list comprises:
   generating the reference picture list; and
   storing the reference picture list.

3. The image processing method of claim 1, wherein the managing includes:
   restoring the reference picture list of the current image to a reference picture list of a previous image if an error is generated in processing the current image.

4. The image processing method of claim 1, wherein the managing includes: generating, by the firmware, the reference picture list of the current image; and using, by the firmware, the reference picture list of the current image for reference picture ordering of the current image if a first slice of the current image starts to be processed by the video engine.

5. The image processing method of claim 1, further comprising:

decoding, by the video engine, the current image according to a decoding method.

6. The image processing method of claim 1, further comprising:
   encoding, by the video engine, the current image according to an encoding method.

7. The image processing method of claim 6, wherein the encoding method is one of HEVC, VP8, VP9, MPEG-2, MPEG-4, H.263, and H.264.

8. The image processing method of claim 1, further comprising:
   parsing header information of a next image of the current image while the video engine processes the current image, the parsing the header information of the next image occurring after the managing.

9. An image processing method comprising:
   obtaining at least one slice of a frame;
   processing, by hardware, the at least one slice;
   managing, by firmware, a reference picture list associated with the frame during the processing; and
   determining whether the at least one slice is a last slice of the frame, the managing being based on the determining,
   wherein the managing manages the reference picture list when the at least one slice is the last slice of the frame.

10. The method of claim 9, wherein the managing includes:
    updating the reference picture list.

11. The method of claim 9, wherein the processing is one of encoding a picture of the frame and decoding the picture of the frame, the picture including the at least one slice.

* * * * *